(12) United States Patent
Luca'

(10) Patent No.: US 8,985,698 B2
(45) Date of Patent: Mar. 24, 2015

(54) SEAT BELT FOR A MOTOR VEHICLE FRONT SEAT

(71) Applicant: Fiat Group Automobiles S.p.A., Turin (IT)

(72) Inventor: Rosario Luca', Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 14/212,475

(22) Filed: Mar. 14, 2014

(65) Prior Publication Data

US 2014/0284991 A1    Sep. 25, 2014

(30) Foreign Application Priority Data

Mar. 14, 2013 (IT) .................................. TO13A0199

(51) Int. Cl.
| | |
|---|---|
| *A47D 15/00* | (2006.01) |
| *B60R 22/12* | (2006.01) |
| *B60R 22/18* | (2006.01) |
| *B60R 22/00* | (2006.01) |

(52) U.S. Cl.
CPC ......... *B60R 22/12* (2013.01); *B60R 2022/1843* (2013.01); *B60R 2022/008* (2013.01); *B60R 2022/1806* (2013.01)

USPC ...... 297/481; 297/482; 297/463.1; 297/463.2

(58) Field of Classification Search
USPC ......... 297/481, 482, 463.1, 463.2; 280/801.1, 280/808
See application file for complete search history.

(56) References Cited

U.S. PATENT DOCUMENTS

| | | | | |
|---|---|---|---|---|
| 3,125,374 | A * | 3/1964 | Bissell ........................ | 297/475 |
| 3,126,228 | A * | 3/1964 | Greene et al. ................ | 297/482 |
| 3,279,851 | A * | 10/1966 | Hinchcliff .................... | 297/481 |
| 3,314,719 | A * | 4/1967 | Johnson ...................... | 297/481 |
| 4,223,917 | A * | 9/1980 | Mori et al. ................... | 280/806 |
| 4,542,939 | A * | 9/1985 | Geoffrey ..................... | 297/481 |
| 5,951,112 | A * | 9/1999 | Hansson ...................... | 297/482 |
| 6,666,519 | B2 * | 12/2003 | Palliser et al. ............... | 297/483 |
| 7,648,208 | B2 * | 1/2010 | Weinstein et al. ........... | 297/481 |
| 7,862,125 | B2 * | 1/2011 | Weinstein et al. ........... | 297/481 |
| 8,528,985 | B2 * | 9/2013 | Miyagawa et al. .......... | 297/474 |

* cited by examiner

*Primary Examiner* — Laurie Cranmer
(74) *Attorney, Agent, or Firm* — Dickstein Shapiro LLP

(57) ABSTRACT

A seat belt for a motor vehicle front seat is provided with a belt having a lower branch that has one end designed to be connected to an anchor point in the motor vehicle and is thickened via an additional element; the additional element is arranged on just one of the faces of the belt, along a rear edge of the lower branch, and comprises a bar, which is substantially parallel to said rear edge and is fixed to the belt.

3 Claims, 1 Drawing Sheet

SEAT BELT FOR A MOTOR VEHICLE FRONT SEAT

The present invention relates to a seat belt for a motor vehicle front seat.

BACKGROUND OF THE INVENTION

In some embodiments of motor vehicles, the front seat is provided with a control lever, which is arranged on the outer side, i.e., towards the front side door, normally faces forwards and/or downwards, and may be raised manually so that it turns about a horizontal axis, orthogonal to the travel direction of the motor vehicle. When said lever is turned upwards, it enables the user to adjust the inclination of the backrest and/or enables inclination forwards of the backrest itself to allow passengers that are to occupy the rear seats to enter from the front side door.

At the same time, the front seat is associated to a seat belt, which has a lower branch connected, at one end thereof, to the bodywork of the motor vehicle, at an anchor point arranged alongside the front seat.

In use, the lower branch of the seat belt tends to slide into the gap between the side of the seat and the aforesaid lever, not only generating difficulties in operation of the lever, but also causing a non-optimal operation of the seat belt in the event of impact of the motor vehicle, in particular if a pretensioner device is provided at the aforesaid anchor point.

To prevent these drawbacks, prior art solutions envisage the use of an additional sheath, fitted around the lower branch of the seat belt so as to thicken it in practice in this area.

There is felt the need to find an alternative solution that will be relatively simple and less costly.

SUMMARY OF THE INVENTION

The aim of the present invention is to provide a seat belt for a motor vehicle front seat that will enable the need set forth above to be met.

According to the present invention, a seat belt for a motor vehicle front seat is provided, as defined in claim 1.

BRIEF DESCRIPTION OF THE DRAWINGS

The invention will now be described with reference to the annexed drawings, which show a non-limiting example of embodiment thereof and in which.

DETAILED DESCRIPTION OF THE INVENTION

Figure 1:
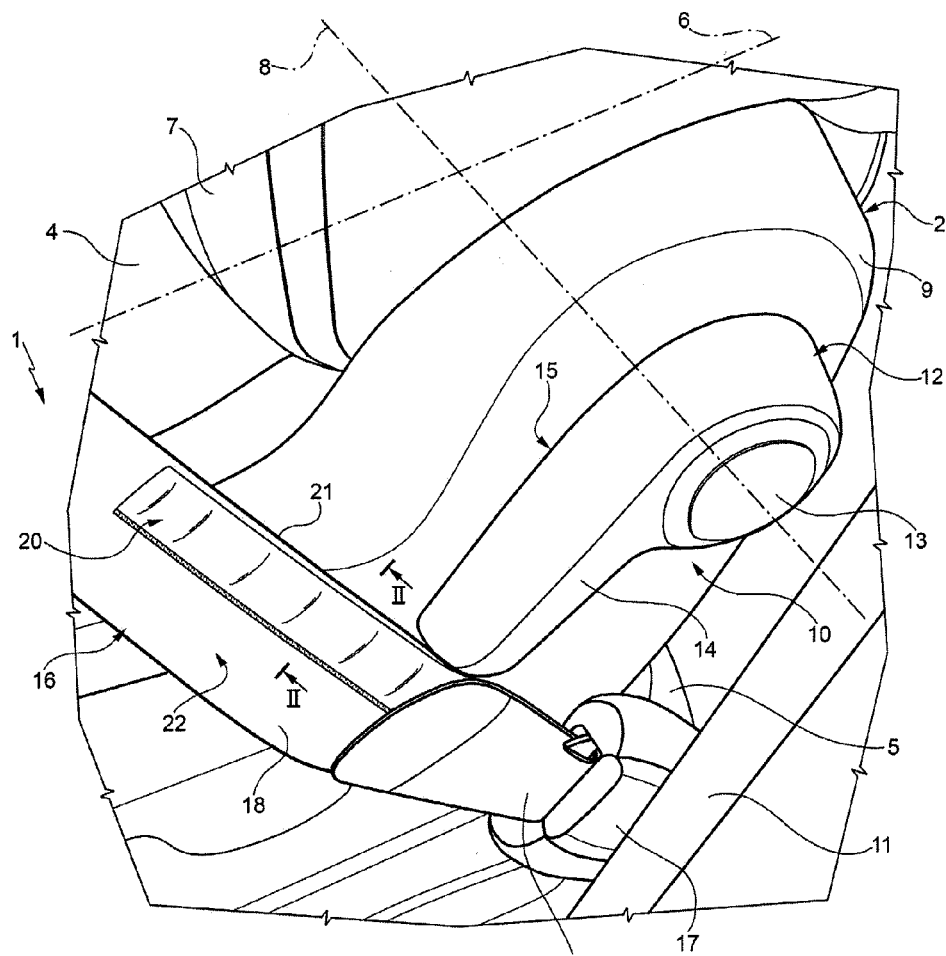
FIG. 1 is a partial view of a preferred embodiment of the seat belt for a motor vehicle front seat, according to the present invention.

In FIG. 1, the reference number 1 designates, as a whole, a seat belt (partially shown) for a front seat 2 (partially illustrated) arranged in the passenger compartment of a motor vehicle.

The seat 2 is of a "per se" known type and comprises a sitting portion 4, which is coupled in a way not illustrated to a floor panel forming part of the bodywork 5 of the motor vehicle so that it may slide in a longitudinal direction 6 parallel to the travel direction of the motor vehicle. The seat 2 further comprises a backrest 7, which is coupled to the sitting portion 4 (in a way that is not described in detail) so as to have a variable inclination with respect to the sitting portion 4 about a hinge axis 8 that is horizontal and orthogonal to the direction 6. In particular, the seat 2 comprises two sides, which are fixed with respect to the sitting portion 4 and are arranged on opposite sides of a lower portion of the backrest 7. FIG. 1 shows just one of such sides, which is designated by the reference number 9 and has a lateral surface 10 that is substantially vertical and faces a door sill 11 of the motor vehicle.

The seat 2 supports a lever 12, which is arranged on the lateral surface 10 and comprises a portion 13 hinged about a horizontal axis of rotation, which preferably coincides with the hinge axis 8.

The lever 12 comprises an arm 14, which, in a resting condition, faces forwards and/or downwards and, in use, is raised manually by a user to impart an action on the seat 2, in particular to incline the backrest 7. The arm 14 is substantially parallel to the lateral surface 10 and is arranged at a horizontal distance from the latter with a gap 15 of relatively small dimensions.

The seat belt 1 comprises a belt 16, which is connected to the bodywork 5 in three anchor points, one of which is shown in FIG. 1 and is designated by the reference number 17. The configuration of the anchor points is of a standard type: the anchor point 17 is arranged at the bottom, alongside the seat 2, along the outer side of the passenger compartment, for example between the door sill 11 and the side 9; the second anchor point is arranged on the same side, but at the top, substantially at the same height as a headrest (not shown) of the seat 2 and comprises, in general, a winding device (not shown); the third anchor point, instead, is defined by a buckle (not shown), which is arranged at the bottom, on the opposite side of the anchor point 17 with respect to the sitting portion 4, and enables releasable engagement of a tab (not shown) that forms part of the seat belt 1 and is slidably coupled to the belt 16.

The belt 16 comprises a lower branch 18, which is arranged alongside the lateral surface 10 and has one end 19 connected to the anchor point 17 in a way known and not described in detail. The seat belt 1 comprises an additional element 20, which is fixed to the branch 18 and is arranged in the proximity of a rear edge 21 of the branch 18 so as to thickening the belt 16 in this area and prevent the rear edge 21 from sliding into in the gap 15.

Figure 2:
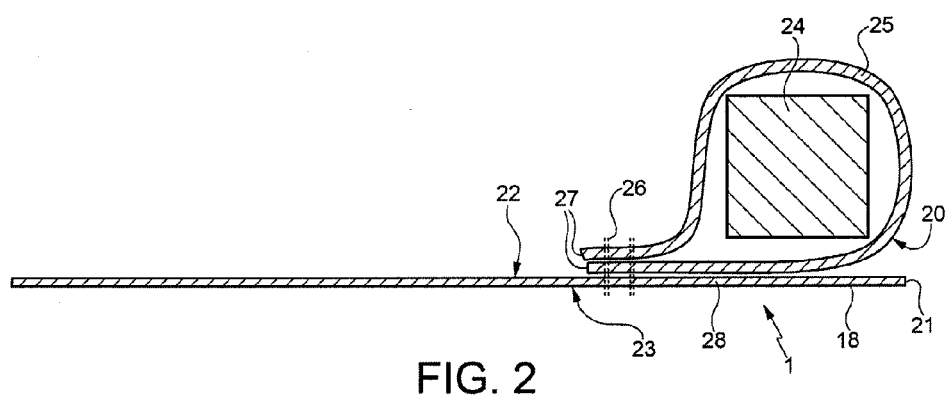
FIG. 2 is a cross section of the seat belt, along the section trace II-II indicated in FIG. 1.

With reference to FIG. 2, the additional element 20 is arranged on just one of the two faces 22, 23 of the belt 16 and comprises a bar or rod 24, substantially parallel to the rear edge 21. FIG. 1 shows that the additional element 20 is arranged on the face 22 facing the outside of the passenger compartment for reasons of clarity of representation, but it is effectively preferable for it to be arranged on the opposite face 23, i.e., the one facing the sitting portion 4 in order not to alter the aesthetic appearance of the seat belt 1 towards the outside of the motor vehicle when the seat belt 1 is worn, i.e., hooked to the aforesaid buckle.

The shape and dimensions of the cross section of the bar 24 are established in the design stage so as to perform as well as possible the function of obstacle to prevent sliding of the rear edge 21 into the gap 15. The length of the bar 24 must preferably be sufficient to cover the lateral surface 10. For instance, said length is approximately 20 cm. As regards the material of the bar 24, a plastic material of relatively low quality is used, for example a recycled polyurethane (URS).

The additional element 20 further comprises a covering strap 25, which is made of a material having high resistance to rubbing, for example of the same material of which the belt 16 is made, covers the bar 24, and is fixed along its own edges 27 to the branch 18 via seams 26. Consequently, in addition to hiding the bar 24, the covering strap 25 defines a system of connection for fixing the bar 24 to the belt 16.

Preferably, the covering strap 25 is folded so as to surround the bar 24 and to arrange the two edges 27 on top of one another, which are then to be arranged in turn on top of an intermediate portion 28 of the branch 18. In this way, the bar 22 is closed within the covering strap 25 and is thus arranged in a stable position with respect to the covering strap 25 to when the latter is stitched to the belt 16, so that coupling is relatively simple.

As an alternative to the covering strap 25, the bar 24 could be fixed to one of the faces 22, 23 via an adhesive. In this case, the material of the bar 24 must be chosen so as to have itself a high resistance to rubbing.

From the characteristics set forth above, it emerges clearly how the additional element 20 is relatively inexpensive and simple, both as regards its construction and as regards coupling to the belt 16 as compared to the known solutions in which a sheath is provided fitted around the branch 18.

In particular, the materials of the additional element 20 may be chosen so as to have a relatively low aesthetic quality in so far as they do not remain in view, especially if the additional element 20 is fixed to the face 23 facing the sitting portion 4.

Furthermore, as mentioned above, the coupling of the additional element 20 is relatively simple and fast, in so far as it is sufficient to rest the additional element 20 on one of the faces 22, 23 and stitch the covering strap 25 to the belt 16.

Finally, from the foregoing description it emerges clearly that modifications and variations may be made to the seat belt 1 described with reference to the attached figures, without thereby departing from the scope of the present invention, as defined in the annexed claims.

In particular, as mentioned above, the system for fixing the additional element 20 to the branch 18 could be different from the one indicated by way of example.

The invention claimed is:

1. A seat belt for a motor vehicle front seat, the seat belt comprising:
   a belt comprising a lower branch, which is defined by a first face and a second face opposite to one another and has one end designed to be connected to an anchor point in the motor vehicle; and
   an additional element for thickening said lower branch;
   wherein said additional element comprises:
   a bar arranged on said first face along a rear edge of said lower branch, and substantially parallel to said rear edge; and
   a covering strap that is arranged only on said first face, covers said bar and is fixed along its edges to said lower branch.

2. A seat belt according to claim 1, wherein said covering strap is stitched to said lower branch.

3. A seat belt according to claim 2, wherein said covering strap is folded so as to surround said bar.

\* \* \* \* \*